(12) United States Patent
Nishikawa

(10) Patent No.: US 10,232,576 B2
(45) Date of Patent: Mar. 19, 2019

(54) TIRE

(71) Applicant: TOYO TIRE & RUBBER CO., LTD., Osaka-shi, Osaka (JP)

(72) Inventor: Shuichi Nishikawa, Osaka (JP)

(73) Assignee: Toyo Tire Corporation, Itami-Shi (JP)

(*) Notice: Subject to any disclaimer, the term of this patent is extended or adjusted under 35 U.S.C. 154(b) by 186 days.

(21) Appl. No.: 15/340,294

(22) Filed: Nov. 1, 2016

(65) Prior Publication Data
US 2017/0136823 A1 May 18, 2017

(30) Foreign Application Priority Data

Nov. 16, 2015 (JP) ................................. 2015-224018

(51) Int. Cl.
*B60C 11/00* (2006.01)
*B29D 30/12* (2006.01)

(52) U.S. Cl.
CPC .............. *B29D 30/12* (2013.01); *B60C 11/00* (2013.01); *B60C 2011/0091* (2013.01)

(58) Field of Classification Search
CPC .. B60C 11/01; B60C 2011/0091; B29D 30/12
See application file for complete search history.

(56) References Cited

U.S. PATENT DOCUMENTS

| | | | | |
|---|---|---|---|---|
| 3,251,722 A | * | 5/1966 | Holman | B29D 30/60 156/130 |
| 3,264,162 A | * | 8/1966 | Holman | B29D 30/60 156/117 |
| 4,398,492 A | * | 8/1983 | Casey | B29C 73/166 118/105 |
| 4,398,583 A | * | 8/1983 | Casey | B29C 73/166 152/504 |
| 9,028,630 B2 | * | 5/2015 | Asayama | B29D 30/60 152/152.1 |

(Continued)

FOREIGN PATENT DOCUMENTS

| | | |
|---|---|---|
| EP | 3199379 A4 * | 5/2018 |
| JP | 2006-69130 A | 3/2006 |
| JP | 2009-119824 A | 6/2009 |

OTHER PUBLICATIONS

Office Action dated Nov. 1, 2017, issued in counterpart Chinese Application No. 201610874393.8, with English tanslation. (12 pages).

(Continued)

*Primary Examiner* — Jodi C Franklin
(74) *Attorney, Agent, or Firm* — Westerman, Hattori, Daniels & Adrian.

(57) ABSTRACT

In a tire, a ribbon rubber includes a first inclining portion which inclines with respect to a tire-circumferential direction from an outside second row of a tire-width direction toward an outside first row in a winding direction; and a first parallel portion placed parallel to the tire-circumferential direction to configure the outside first row of the tire-width direction, a winding-start end of the first parallel portion being connected to a winding-finishing end of the first inclining portion, the winding-finishing end of the first parallel portion is placed closer to the winding direction than the winding-finishing end of the first inclining portion, or is placed at the same position as the winding-finishing end.

6 Claims, 12 Drawing Sheets

(56) References Cited

U.S. PATENT DOCUMENTS

| | | | | |
|---|---|---|---|---|
| 9,085,115 B2* | 7/2015 | Yoshikawa | ......... | B29D 30/1635 |
| 2006/0048873 A1* | 3/2006 | Kudo | .................... | B29D 30/30 |
| | | | | 152/209.1 |
| 2009/0126846 A1* | 5/2009 | Tada | ................. | B29D 30/3028 |
| | | | | 152/526 |
| 2010/0258227 A1* | 10/2010 | Kuroki | .............. | B29D 30/3028 |
| | | | | 152/209.5 |
| 2013/0192730 A1* | 8/2013 | Morozumi | ................ | B60C 9/00 |
| | | | | 152/209.1 |
| 2014/0138006 A1* | 5/2014 | Inoue | ................. | B60C 11/0008 |
| | | | | 152/526 |
| 2017/0157986 A1* | 6/2017 | Nishikawa | ......... | B29D 30/3028 |

OTHER PUBLICATIONS

Office Action dated Nov. 1, 2017, issued in counterpart Chinese Application No. 2016108774393.8, with English translation. (12 pages).

* cited by examiner

TIRE

CROSS REFERENCE TO RELATED APPLICATIONS

This application claims the benefit of priority of Japanese application no. 2015-224018, filed on Nov. 16, 2015, which is incorporated herein by reference.

BACKGROUND OF THE INVENTION

Field of the Invention

The present invention relates to a tire having a rubber portion formed from ribbon rubber which is spirally wound along a tire-circumferential direction.

Description of the Related Art

As a conventional tire, there is known one having a rubber portion formed from ribbon rubber which is spirally wound along a tire-circumferential direction (e.g., JP-A-2006-69130, JP-2009-119824). Specifically, an unvulcanized tire having a rubber portion formed by spirally winding an unvulcanized ribbon rubber is vulcanized, thereby forming a vulcanized tire.

Here, depending upon a winding manner of unvulcanized ribbon rubber, a rubber-insufficient area (area where rubber does not exist, or areas where rubber is insufficient) is generated in ends of the rubber portion in the tire-width direction in some cases. In such a case, due to the rubber-insufficient area, a vulcanized tire in which air is mixed into the ends of the rubber portion in the tire-width direction is prone to be formed.

SUMMARY OF THE INVENTION

Hence, in view of the above-described circumstances, it is an object of the present invention to provide a tire capable of restraining a rubber-insufficient area from generating in tire-width direction ends of a rubber portion formed from ribbon rubber.

There is provided a pneumatic tire, which includes:

a rubber portion formed by a ribbon rubber which is spirally wound along a tire-circumferential direction, wherein the ribbon rubber includes:

a first inclining portion which inclines with respect to the tire-circumferential direction from an outside second row of a tire-width direction toward an outside first row in a winding direction; and a first parallel portion placed parallel to the tire-circumferential direction to configure the outside first row of the tire-width direction, a winding-start end of the first parallel portion being connected to a winding-finishing end of the first inclining portion, the winding-finishing end of the first parallel portion is placed closer to the winding direction than the winding-finishing end of the first inclining portion, or is placed at the same position as the winding-finishing end.

Also, the tire may have a configuration in which:

the ribbon rubber further includes:

a second inclining portion which inclines with respect to the tire-circumferential direction from the outside first row of the tire-width direction in the winding direction toward the outside second row, a winding-start end of the second inclining portion being connected to the winding-finishing end of the first parallel portion;

a second parallel portion placed parallel to the tire-circumferential direction to configure the outside second row of the tire-width direction, a winding-start end of the second parallel portion being connected to a winding-finishing end of the second inclining portion; and a third inclining portion which inclines with respect to the tire-circumferential direction from the outside second row of the tire-width direction in the winding direction toward an outside third row, a winding-start end of the third inclining portion being connected to the winding-finishing end of the second parallel portion, the winding-start end of the third inclining portion is placed at a position more opposite from the winding direction than the winding-start end of the second inclining portion, and the winding-finishing end of the third inclining portion is placed at a position more opposite from the winding direction than the winding-finishing end of the second inclining portion.

Also, the tire may have a configuration in which:

the ribbon rubber further includes:

a third parallel portion placed parallel to the tire-circumferential direction to configure the outside third row of the tire-width direction, a winding-start end of the third parallel portion being connected to the winding-finishing end of the third inclining portion; and a fourth inclining portion which inclines with respect to the tire-circumferential direction from the outside third row of the tire-width direction in the winding direction toward an outside fourth row, a winding-start end of the fourth inclining portion being connected to the winding-finishing end of the third parallel portion, the winding-finishing end of the third inclining portion is placed at a position more opposite from the winding direction than the winding-start end of the second inclining portion or is placed at the same position as the winding-start end, the winding-finishing end of the third parallel portion is placed at a position closer to the winding direction than the winding-finishing end of the third inclining portion, or is placed at the same position as the winding-finishing end, and the winding-finishing end of the fourth inclining portion is placed at a position more opposite from the winding direction than the winding-start end of the second inclining portion, or is placed at the same position as the winding-start end.

Also, the tire may have a configuration in which:

the winding-finishing end of the first parallel portion is placed at the same position as the winding-finishing end of the first inclining portion, the winding-finishing end of the third inclining portion is placed at a position more opposite from the winding direction than the winding-start end of the second inclining portion, and is placed at the same position as the winding-start end of the first inclining portion, the winding-finishing end of the third parallel portion is placed at the same position as the winding-finishing end of the third inclining portion, and the winding-finishing end of the fourth inclining portion is placed at the same position as the winding-start end of the second inclining portion.

Also, the tire may have a configuration in which:

all of lengths of the inclining portions in the tire-circumferential direction are the same.

Also, the tire may have a configuration in which:

all of inclination angles of the inclining portions with respect to the tire-circumferential direction are the same.

As described above, the tire of the present invention exerts an excellent effect that it is possible to restrain a rubber-insufficient area from generating in tire-width direction ends of a rubber portion formed from ribbon rubber.

DETAILED DESCRIPTION OF THE PREFERRED EMBODIMENTS

Figure 1:
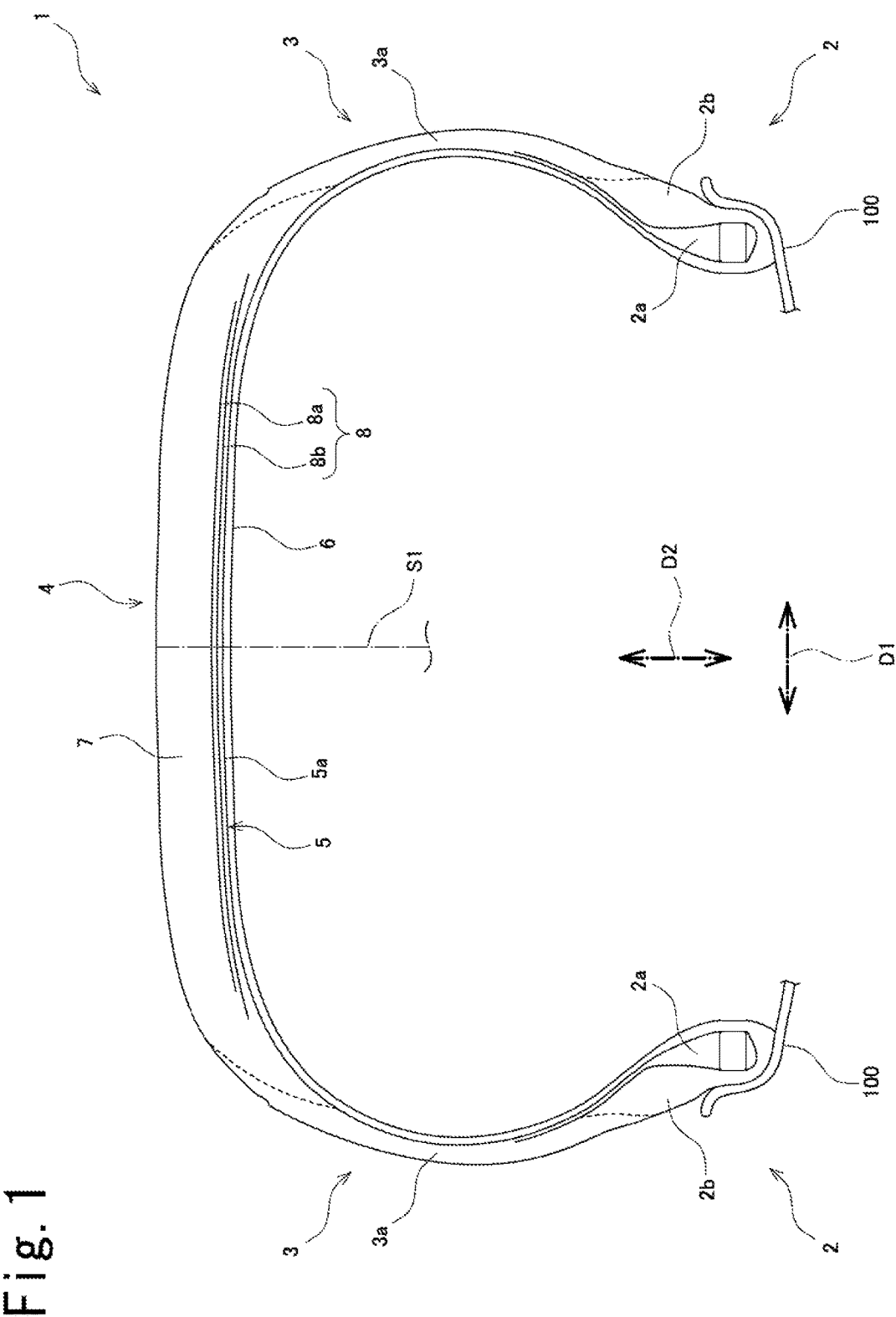
FIG. 1 is a sectional view of essential portions in a tire meridian surface of a tire according to an embodiment.

Embodiments of a tire will be described with reference to FIGS. 1 to 12. In the drawings (including FIGS. 13 and 14), sizes of the drawings do not absolutely match with actual sizes.

As shown in FIG. 1, the tire 1 according to one of embodiments includes a pair of bead portions 2 each having a bead 2a, sidewall portions 3 extending from the respective bead portions 2 outward in a tire-radial direction D2, and a tread portion 4 which is connected to outer ends of the pair of sidewall portions 3 in the tire-radial direction D2 to configure a tread surface. In this embodiment, the tire 1 is a pneumatic tire into which air is charged. The tire 1 is mounted around a rim 100.

In FIG. 1, a tire-width direction D1 is a lateral direction. The tire-radial direction D2 is a radial direction of the tire 1, and a tire-circumferential direction D3 (not shown in FIG. 1) is a direction around a rotation axis of the tire. In FIG. 1, the tire-radial direction D2 which is parallel to a paper sheet is a vertical direction. A tire equatorial plane S1 is a plane which intersects with the tire rotation axis at right angles and which is located at a center of the tire-width direction D1. The tire meridian surface includes the tire rotation axis, and intersects with the tire equatorial plane S1 at right angles.

The tire 1 also includes a carcass layer 5 extending between the pair of beads 2a and 2a, and an inner liner 6 placed on an inner side of the carcass layer 5. The inner liner 6 has an excellent function to prevent gas from passing through the inner liner 6 for maintaining air pressure. The carcass layer 5 and the inner liner 6 are placed along an inner periphery of the tire across the bead portions 2, the sidewall portions 3 and the tread portion 4.

In this embodiment, the carcass layer 5 is composed of one carcass ply 5a. The carcass ply 5a is folded back around the beads 2a and 2a such that the carcass ply 5a surrounds the beads 2a and 2a. To configure an outer surface, the bead portions 2 respectively include rim strip rubbers 2b placed on an outer side of the carcass ply 5a in the tire-width direction D1. To configure the outer surface, the sidewall portions 3 respectively include sidewall rubbers 3a placed on an outer side of the carcass layer 5 in the tire-width direction D1.

The tread portion 4 includes a tread rubber 7 placed on an outer peripheral side of the carcass layer 5 to configure a tread surface (ground-contact surface) which comes into contact with the ground. The tread portion 4 also includes a belt layer 8 placed on an outer peripheral side of the carcass layer 5 and on an inner periphery side of the tread rubber 7. In this embodiment, the belt layer 8 includes two layers, i.e., two belt plies 8a and 8b. In this embodiment, ends of the tread rubber 7 in the tire-width direction D1 are laminated on ends of the sidewall rubbers 3a. That is, the tire 1 of the embodiment is of a side-on tread structure.

The tire 1 includes a rubber portion formed from a ribbon rubber which is spirally wound around the tire rotation axis along the tire-circumferential direction D3. In this embodiment, the rubber portion is the tread rubber 7. A forming device 50 which forms the rubber portion will first be described with reference to FIG. 2.

Figure 2:
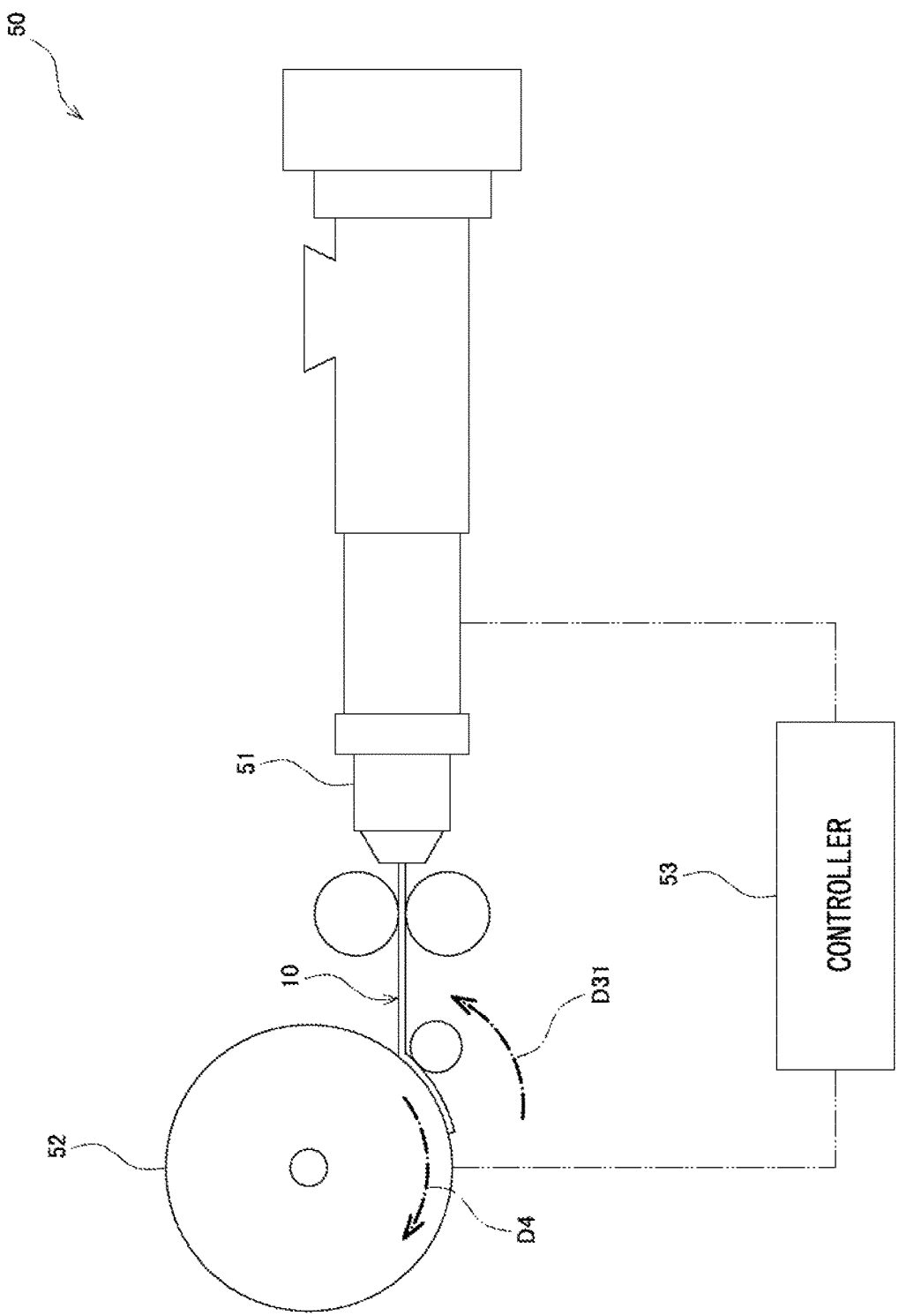
FIG. 2 is a schematic diagram of production facilities for forming the tire of the embodiment.

As shown in FIG. 2, the forming device 50 includes an extruding portion 51 for extruding rubber, and a winding portion 52 around which a string-shaped ribbon rubber 10 is wound. The ribbon rubber 10 is formed by extruding from the extruding portion 51. The forming device 50 also includes a controller 53 which controls the extruding portion 51 and the winding portion 52.

The extruding portion 51 extrudes rubber such that a shape of a cross section of the ribbon rubber 10 becomes uniform. For example, the cross sectional of the ribbon rubber 10 may be formed into such a substantially triangular shape that a central portion of the ribbon rubber 10 in its width direction is the most thick, and its thickness is gradually thinned from the central portion toward both ends. In such a cross sectional shape, it is preferable that a width size is 5 to 50 mm, a thickness of the central portion in the width direction is 0.5 to 3.0 mm, and thicknesses of both sides in the width direction are 0.05 to 0.2 mm.

The cross sectional shape of the ribbon rubber 10 can be various cross sectional shapes in accordance with types of the rubber portion (tread rubber 7) which is to be formed. For example, the cross sectional shape of the ribbon rubber 10 may be a substantially trapezoidal shape, or a flat-plate shape.

The winding portion 52 is formed into a columnar shape, and can rotate around an axis (rotation direction D4). According to this, if the winding portion 52 rotates, the ribbon rubber 10 is wound around an outer periphery of the winding portion 52. The winding portion 52 can relatively be displaced in its axial direction with respect to the extruding portion 51. In this embodiment, the winding portion 52 can move in the axial direction.

The controller 53 controls an extrusion amount of the ribbon rubber 10 and a state (e.g., temperature) of the ribbon rubber 10 by controlling the extruding portion 51. Further, the controller 53 controls rotation speed of the winding portion 52 and a position of the winding portion 52 with respect to the extruding portion 51 by controlling the winding portion 52.

Next, the rubber portion (tread rubber 7) formed by the forming device 50 will be described with reference to FIGS. 3 to 5.

First, when a position of the winding portion 52 is fixed to the extruding portion 51, the ribbon rubber 10 is wound around the winding portion 52 so as to be parallel to the tire-circumferential direction D3. When the winding portion 52 is moving in the axial direction (tire-width direction D1) of the winding portion 52 with respect to the extruding portion 51, the ribbon rubber 10 is wound around the winding portion 52 such that the ribbon rubber 10 intersects with the tire-circumferential direction D3 in an inclining manner.

Figure 3:
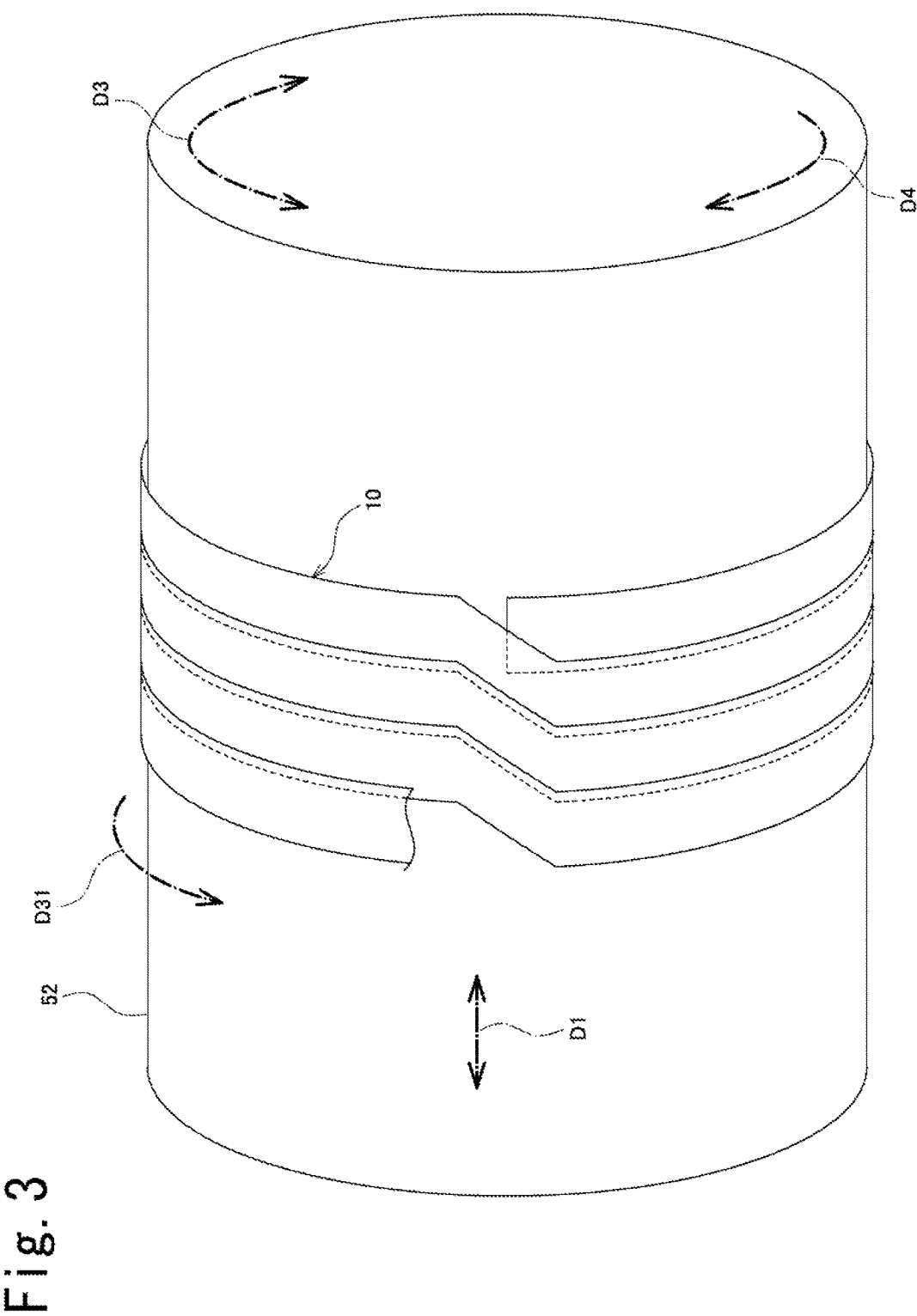
FIG. 3 is a perspective view for describing a winding state of a ribbon rubber of the tire of the embodiment.
Figure 4:
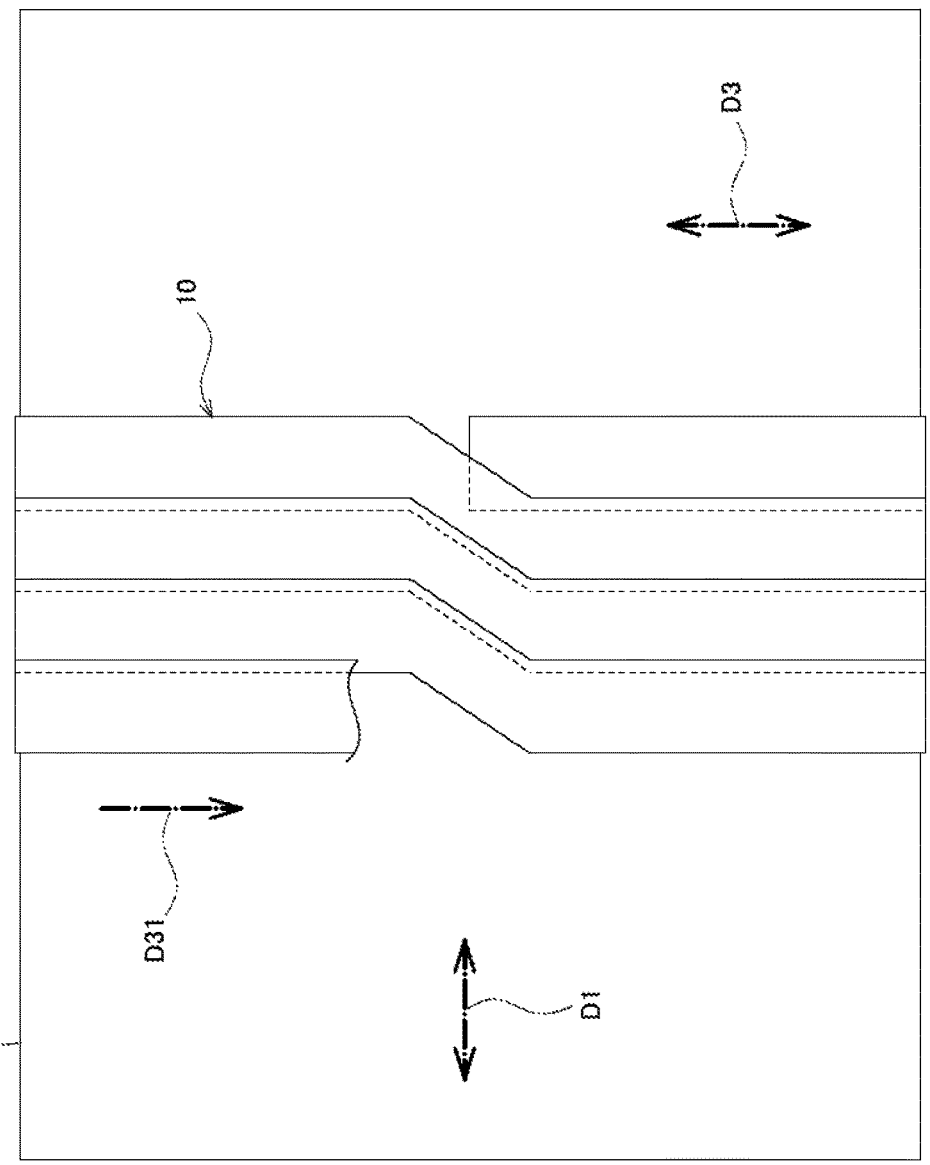
FIG. 4 is a front view for describing the winding state of the ribbon rubber of the tire of the embodiment.

According to this, as shown in FIGS. 3 and 4, the ribbon rubber 10 is repeatedly switched between a state where the ribbon rubber 10 is wound around the winding portion 52 such that the ribbon rubber 10 becomes parallel to the tire-circumferential direction D3 and a state where the ribbon rubber 10 wound around the winding portion 52 such that the ribbon rubber 10 intersects with the tire-circumferential direction D3 in the inclining manner. As a result, the ribbon rubber 10 is spirally wound toward one side in the tire-width direction D1.

At this time, the ribbon rubber 10 is wound around the winding portion 52 such that the ribbon rubber 10 intersects with the tire-circumferential direction D3 in the inclining manner. According to this, the ribbon rubber 10 is sent into the tire-width direction D1 at a predetermined pitch. This pitch is set to be smaller than a width of the ribbon rubber 10. According to this, portions of the ribbon rubber 10 are superposed on each other in the tire-width direction D1.

This superposed amount can be changed by changing the relative displacement amount between the extruding portion 51 and the winding portion 52 in the tire-width direction D1. An inclination angle of the ribbon rubber 10 (inclining portion) with respect to the tire-circumferential direction D3 can be changed by changing the rotation speed of the winding portion 52, and relative displacement speed between the extruding portion 51 and the winding portion 52 in the tire-width direction D1.

Figure 5:
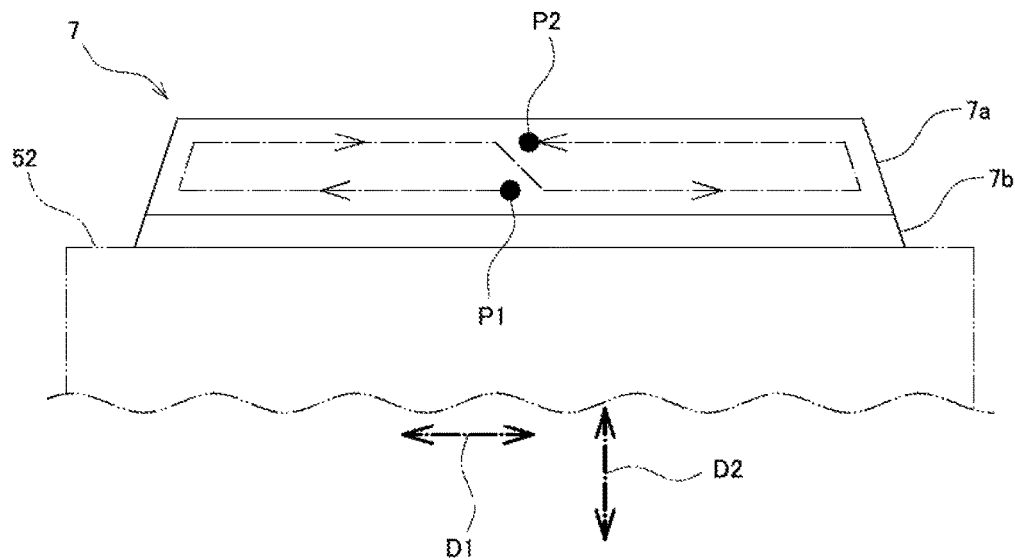
FIG. 5 is a sectional view of essential portions in the tire meridian surface for describing the winding state of the ribbon rubber of the tire of the embodiment.

As shown in FIG. 5, the ribbon rubber 10 forms a cap portion 7a of the tread rubber 7 which is placed on the outer side in the tire-radial direction D2. The tread rubber 7 has a base portion 7b placed on the inner side in the tire-radial direction D2. The base portion 7b is formed on an outer peripheral surface of the winding portion 52 before the cap portion 7a is formed.

Although it is not illustrated in the drawings, the belt layer 8 is also previously wound around the outer peripheral surface of the winding portion 52, and the base portion 7b is formed on the belt layer 8. The base portion 7b may be formed by a ribbon construction technique like the cap portion 7a, or may be formed by a so-called extrusion method. The extrusion method is a technique for extruding and forming an unvulcanized belt-shaped rubber member having a desired cross sectional shape, and ends of the formed rubber member in the tire-circumferential direction D3 are jointed to each other and the rubber portion is formed into an annular shape.

In a cross section of a tire meridian surface, the ribbon rubber 10 is wound around the winding portion 52 from a central start-point P1 in the tire-width direction D1 toward one side of the ribbon rubber 10 in the tire-width direction D1 (left side in FIG. 5). Thereafter, one end of the ribbon rubber 10 in the tire-width direction D1 is folded back on the other side in the tire-width direction D1 (right side in FIG. 5), and the ribbon rubber 10 is wound around the winding portion 52 toward the other end in the tire-width direction D1.

The other end of the ribbon rubber 10 in the tire-width direction D1 is folded back on the one side in the tire-width direction D1, and is wound around the winding portion 52 toward a central ending-point P2 in the tire-width direction D1. To form the cap portion 7a of the tread rubber 7, the ribbon rubber 10 is wound around the winding portion 52 such that the ribbon rubber 10 becomes two layers composed of a lower layer and an upper layer in the tire-radial direction D2.

Figure 6:
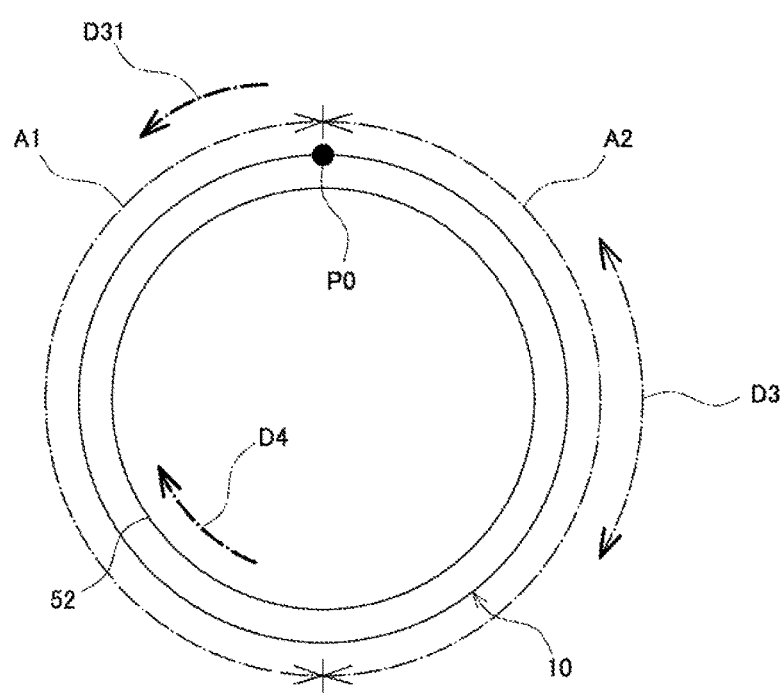
FIG. 6 is a side view for describing the winding state of the ribbon rubber of the tire of the embodiment.

Here, a winding direction D31 will be described with reference to FIGS. 3 to 4 and 6.

As shown in FIGS. 3 and 4, of the tire-circumferential direction D3, the winding direction D31 means a direction in which the ribbon rubber 10 is wound and travelling. In this embodiment, of the tire-circumferential direction D3, the winding direction D31 is a direction opposite from the rotation direction D4 of the winding portion 52. As shown in FIG. 6, a region on the side of the winding direction D31 with respect to a reference position P0 is a half-circumferential region A1 extending from the reference position P0 to the winding direction D31. A region on the side opposite from the winding direction D31 with respect to the reference position P0 is a half-circumferential region A2 extending from the reference position P0 in a direction opposite from the winding direction D31.

A region on the side of the winding direction D31 with respect to the reference position P0 is preferably a ¼-circumferential region extending from the reference position P0 in the winding direction D31 and more preferably, is a ⅛-circumferential region extending from the reference position P0 in the winding direction D31. A region on a side opposite from the winding direction D31 with respect to the reference position P0 is preferably a ¼-circumferential region extending from the reference position P0 to a region opposite from the winding direction D31 and more preferably, is a ⅛-circumferential region extending from the reference position P0 to a region opposite from the winding direction D31.

Next, a winding state of the ribbon rubber 10 in the rubber portion (cap portion 7a of tread rubber 7) will be described with reference to FIGS. 7 to 12 while comparing with comparative examples. A portion of the ribbon rubber 10 folded back at its end on one side (left side in FIGS. 7 to 12) of the tire-width direction D1 will be described. In FIGS. 7 to 12, superposed portions of the ribbon rubber 10 in the tire-width direction D1 are ignored for illustration.

Figure 7:
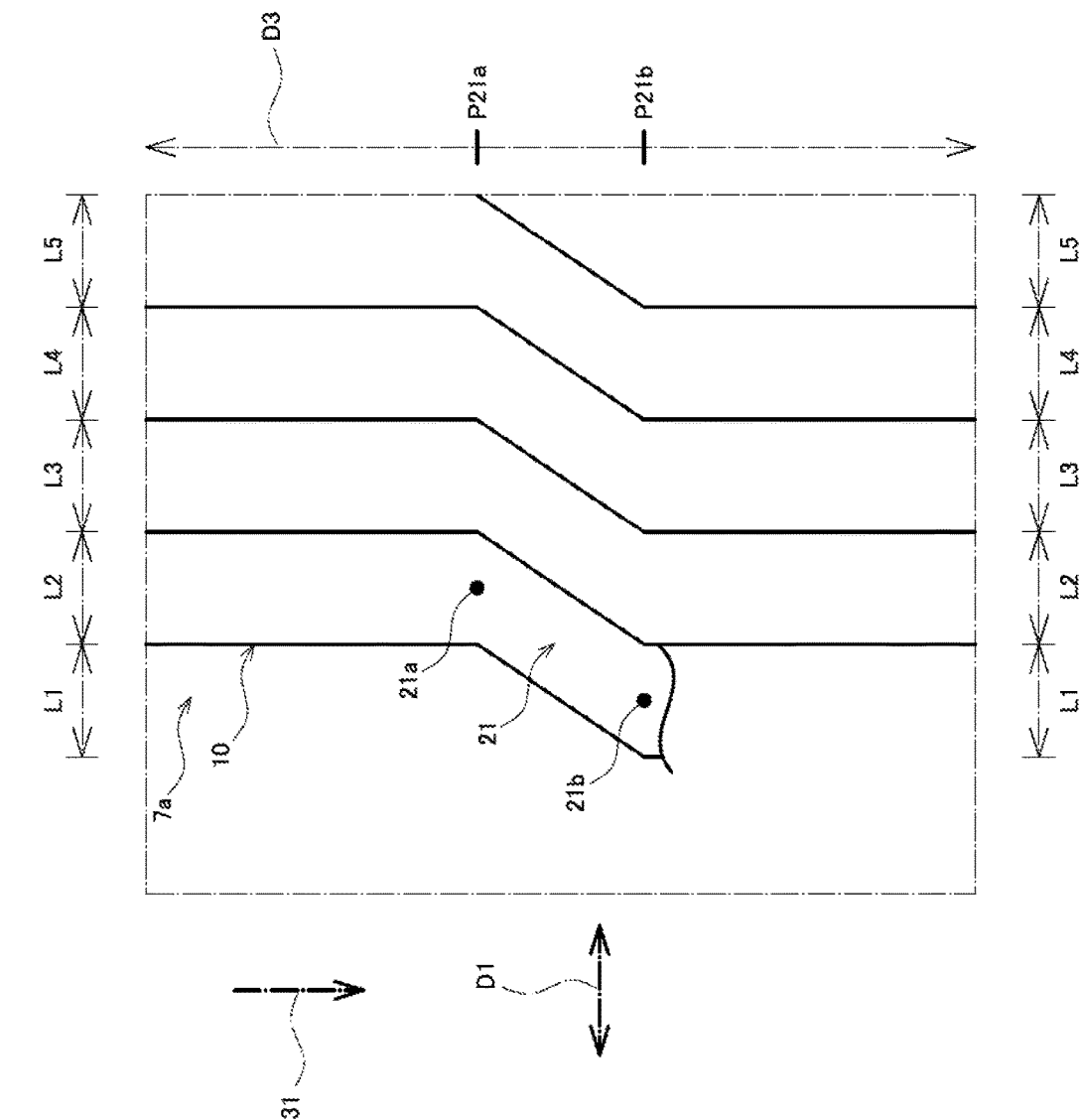
FIG. 7 is a front view of essential portions for describing winding states of a ribbon rubber of the embodiment and a ribbon rubber according to a comparative example.

First, as shown in FIG. 7, the ribbon rubber 10 is wound toward one side in the tire-width direction D1. In rows L2, L3, . . . of the lower layer formed by the ribbon rubber 10, switching positions between a state where the ribbon rubber 10 is wound parallel in the tire-circumferential direction D3 and a state where the ribbon rubber 10 is wound in the inclining manner are the same position in the tire-circumferential direction D3.

According to this, of the lower layer, at least the second row L2 and the third row L3 from outside have uniform rubber amounts in the tire-circumferential direction D3. A portion of the ribbon rubber 10 which is parallel to the tire-circumferential direction D3 is called a parallel portion, and a portion of the ribbon rubber 10 which intersects with the tire-circumferential direction D3 in the inclining manner is called an inclining portion.

The ribbon rubber 10 is wound in the inclining manner with respect to the tire-circumferential direction D3 such that the ribbon rubber 10 moves from the outside second row L2 toward the outside first row L1. According to this, a first inclining portion 21 is placed to incline with respect to the tire-circumferential direction D3 such that the first inclining portion 21 moves from the outside second row L2 toward the outside first row L1 in the winding direction D31.

A winding-start end (start-point end at the time of winding) 21a of the first inclining portion 21 configures an outside second row L2 of the lower layer. A winding-finishing end (ending-point end at the time of winding) 21b of the first inclining portion 21 configures an outside first row L1. In FIG. 7 (FIGS. 8 to 12 are also the same), positions P21a and P21b shows respective positions of the winding-start end 21a and the winding-finishing end 21b of the first inclining portion 21 in the tire-circumferential direction D3.

Figure 8:
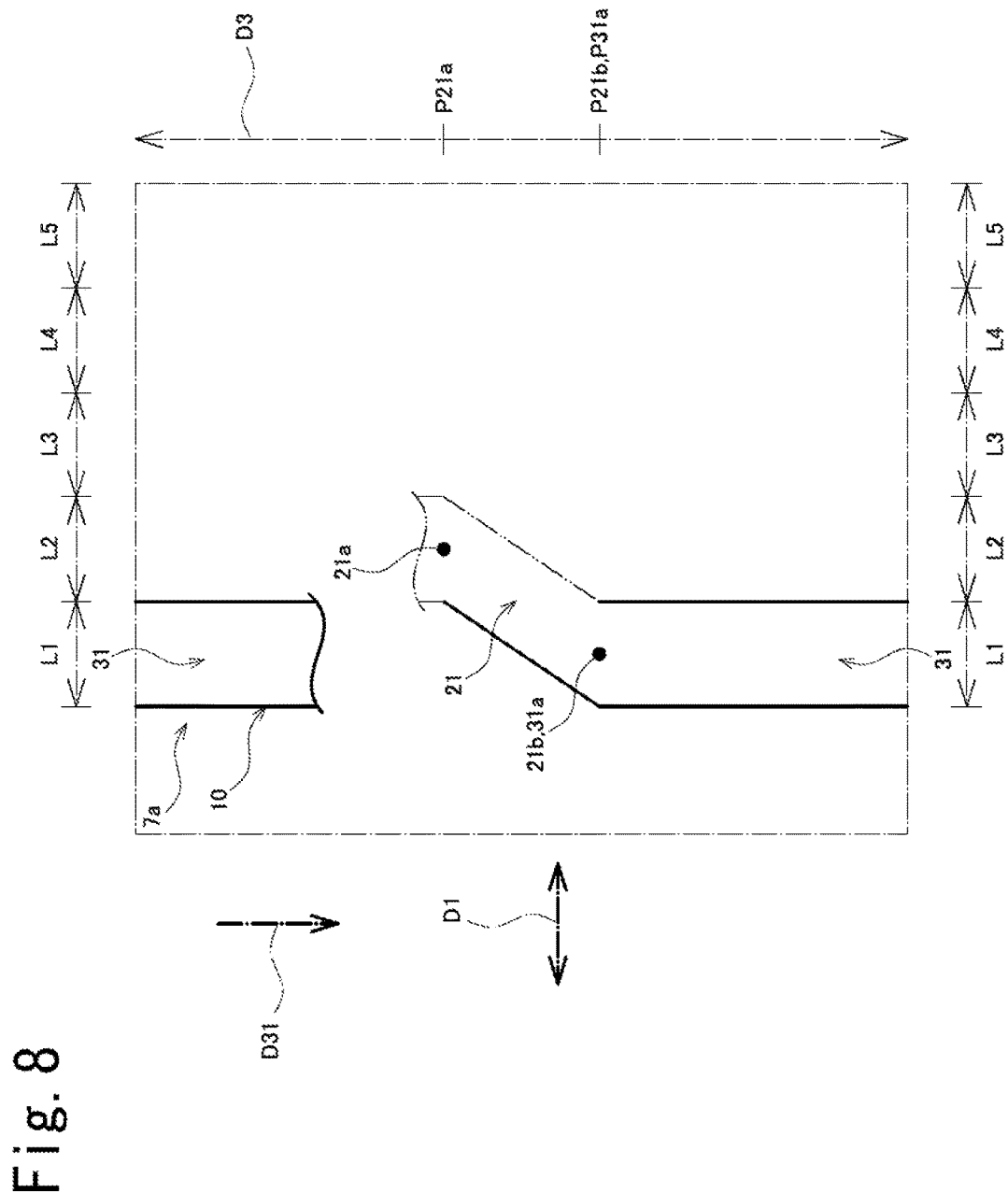
FIG. 8 is a front view of essential portions for describing the winding states of the ribbon rubber of the embodiment and the ribbon rubber according to a comparative example.

Thereafter, as shown in FIG. 8, the ribbon rubber 10 is wound parallel to the tire-circumferential direction D3 in the outside first row L1. According to this, a first parallel portion 31 is placed parallel to the tire-circumferential direction D3. In FIG. 8 (FIGS. 9 to 12 are also the same), a position P31a shows a position of a winding-start end 31a of the first parallel portion 31 in the tire-circumferential direction D3.

In FIG. 8 (FIGS. 9 to 12 are also the same), the lower layer formed by the ribbon rubber 10 is not shown (in FIG. 8, however, the first inclining portion 21 only on the side of winding-start end 21a is shown by phantom line). In the following description, the lower layer is not referred to.

First, a winding state of a ribbon rubber 10 according to a comparative example will be described with reference to FIG. 9.

Figure 9:
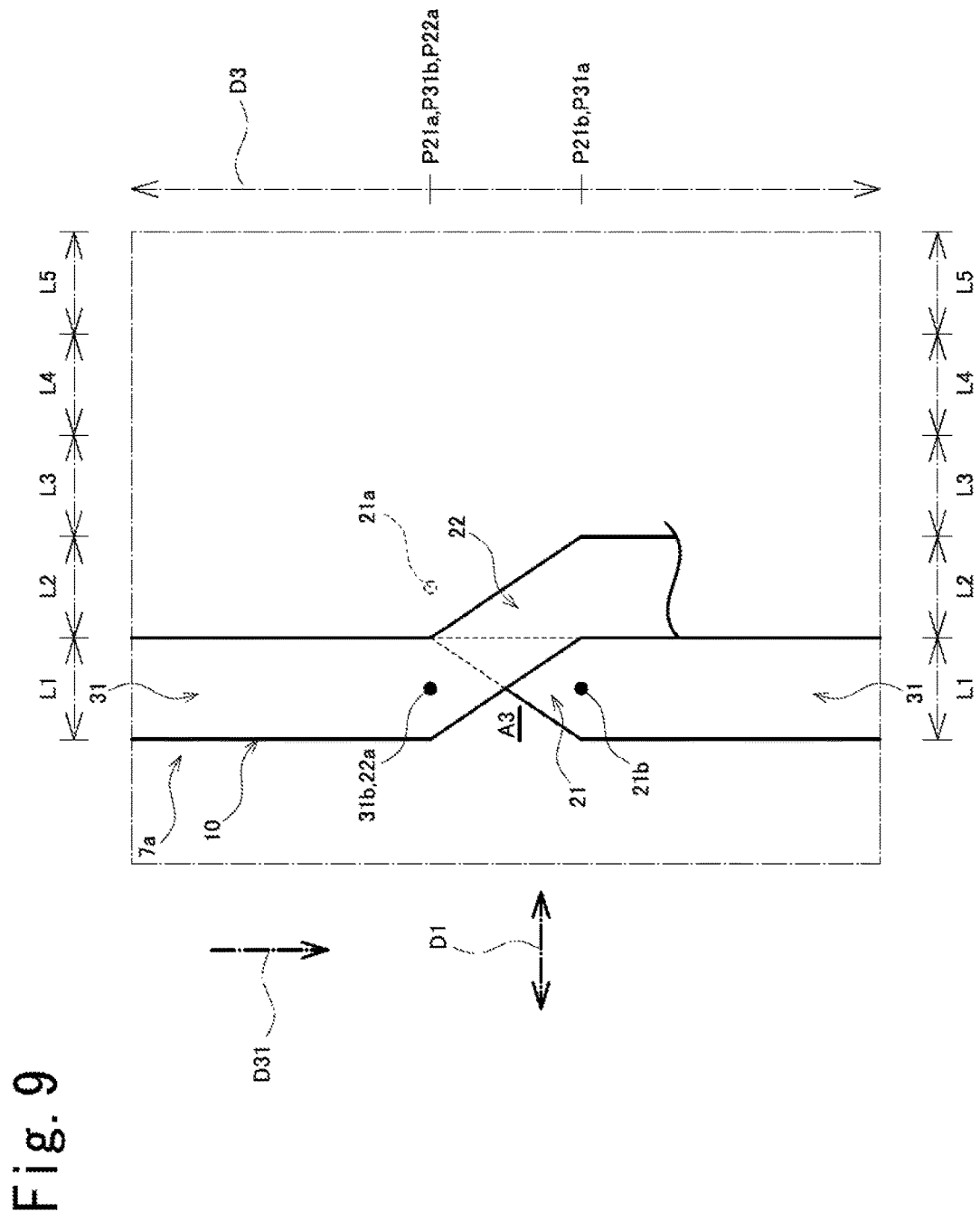
FIG. 9 is a front view of essential portions for describing the winding state of the ribbon rubber according to the comparative example.

As shown in FIG. 9, the ribbon rubber 10 is wound in the inclining manner with respect to the tire-circumferential direction D3 such that the ribbon rubber 10 moves from the outside first row L1 toward the outside second row L2. According to this, the second inclining portion 22 is placed and inclined from the tire-circumferential direction D3 such that the second inclining portion 22 moves from the outside first row L1 toward the outside second row L2 in the winding direction D31.

According to this, the outside first row L1 is composed of the winding-finishing end 21b of the first inclining portion 21, the first parallel portion 31, and a winding-start end 22a of the second inclining portion 22. In FIG. 9, positions P31b and P22a show a position of a winding-finishing end 31b of the first parallel portion 31, and a position of the winding-start end 22a of the second inclining portion 22 in the tire-circumferential direction D3, respectively. At this time, the winding-finishing end 31b of the first parallel portion 31 is at the same position as the winding-start end 21a of the first inclining portion 21 in a winding direction 31.

Therefore, a rubber-insufficient area (specifically, location where rubber does not exist) A3 is generated in the end of the tread rubber 7 in the tire-width direction D1. According to this, due to the rubber-insufficient areas A3, a vulcanized tire in which air is mixed in an end of the tread rubber 7 in the tire-width direction D1, e.g., between the tread rubber 7 and the sidewall rubber 3a is prone to be formed.

A winding state of the ribbon rubber 10 of the embodiment will be described with reference to FIGS. 10 to 12.

Figure 10:
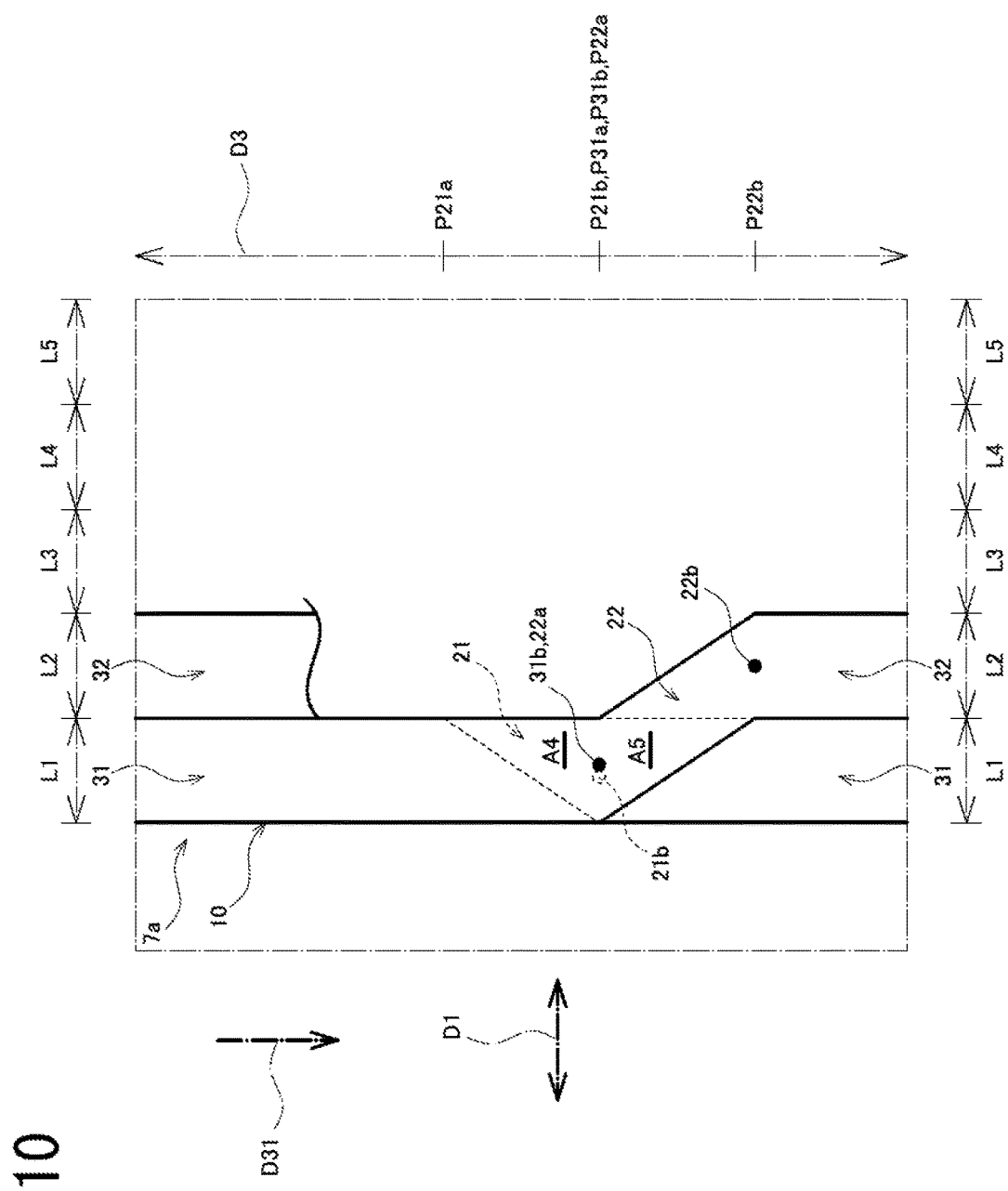
FIG. 10 is a front view of essential portions for describing the winding state of the ribbon rubber according to the embodiment.

In this embodiment also, as shown in FIG. 10, from the winding state of the ribbon rubber 10 as shown in FIG. 8, the ribbon rubber 10 is wound in the inclining manner with respect to the tire-circumferential direction D3 from the outside first row L1 toward the outside second row L2. Therefore, the second inclining portion 22 inclines from the tire-circumferential direction D3 from the outside first row L1 toward the outside second row L2 in the winding direction D31.

The outside first row L1 is composed of the winding-finishing end 21b of the first inclining portion 21, the first parallel portion 31, and the winding-start end 22a of the second inclining portion 22. In FIG. 10 (FIGS. 11 and 12 are also the same), positions P31b, P22a and P22b shows a position of the winding-finishing end 31b of the first parallel portion 31, and a position of the winding-start end 22a and a position of a winding-finishing end 22b of the second inclining portion 22 in the tire-circumferential direction D3, respectively. At this time, the winding-finishing end 31b of the first parallel portion 31 is at the same position as the winding-finishing end 21b of the first inclining portion 21 in the winding direction 31.

Therefore, this configuration prevents the rubber-insufficient area as in the comparative example from generating in the end of the tread rubber 7 in the tire-width direction D1. In the outside first row L1 in the tire-width direction D1, an area A4 where the first parallel portion 31 is superposed on the winding-finishing end 21b of the first inclining portion 21, and an area A5 where the winding-start end 22a of the second inclining portion 22 is superposed on the first parallel portion 31 are rubber-surplus areas.

Figure 11:
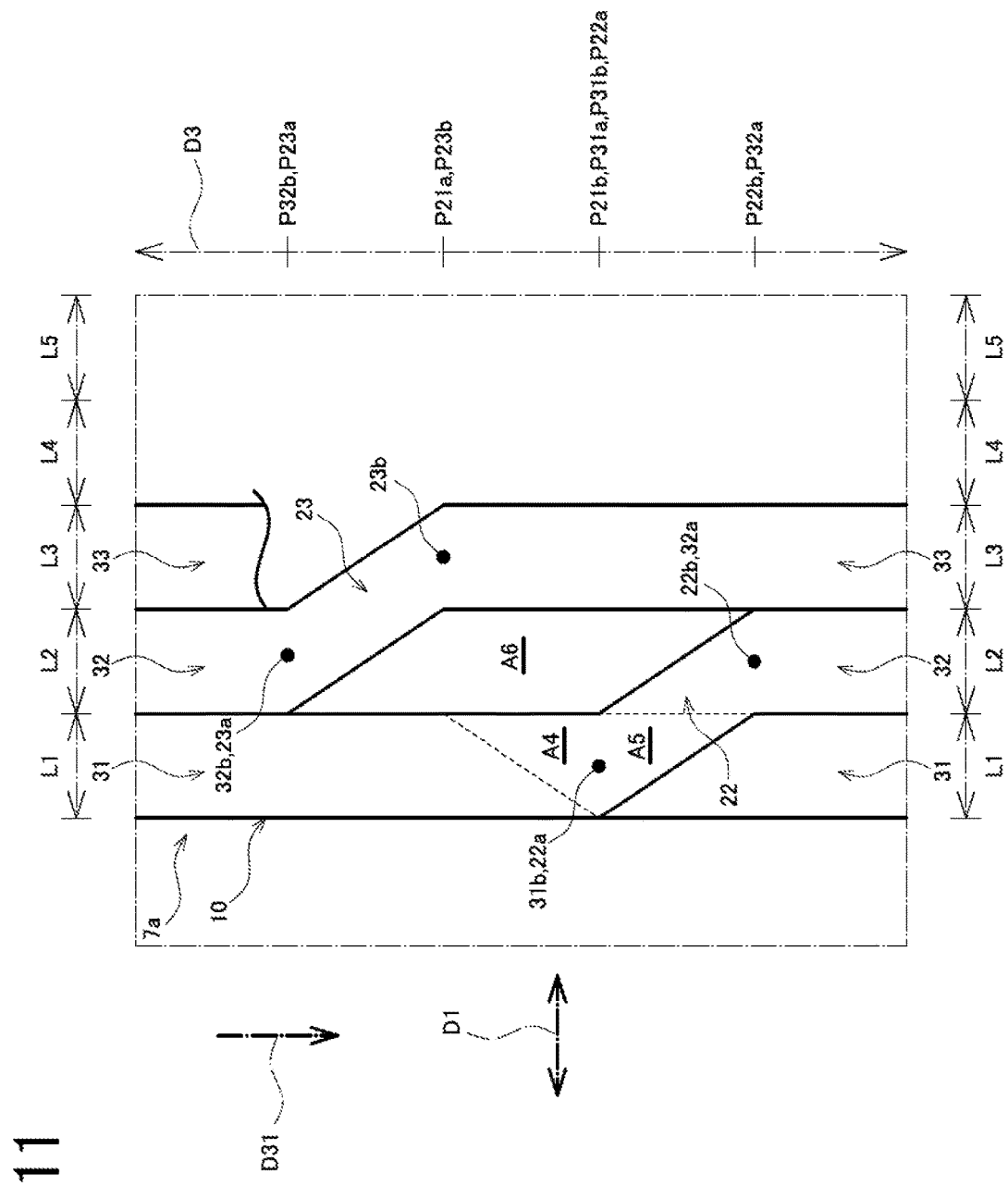
FIG. 11 is a front view of essential portions for describing the winding state of the ribbon rubber according to the embodiment.
Figure 12:
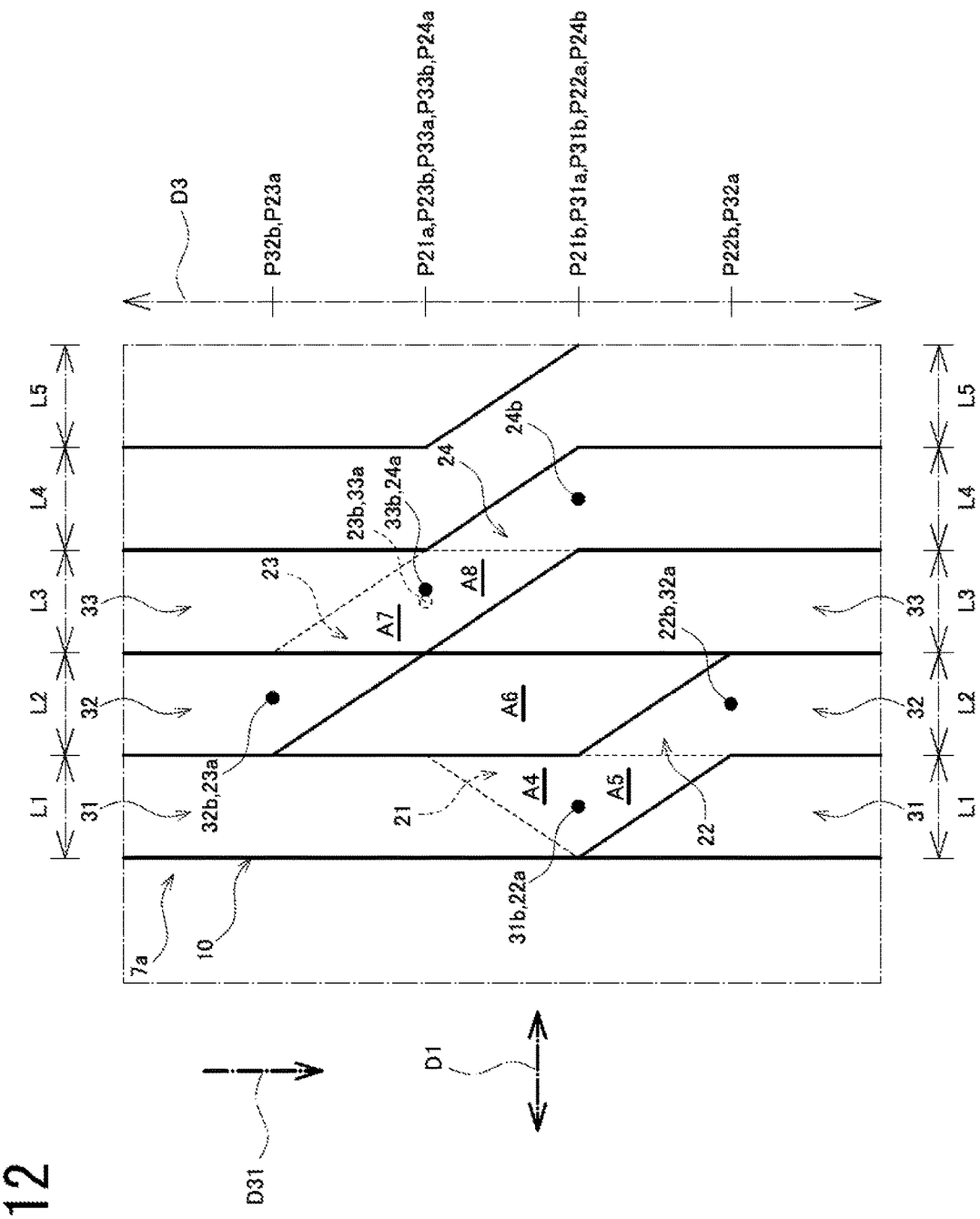
FIG. 12 is a front view of essential portions for describing the winding state of the ribbon rubber according to the embodiment.

Thereafter, the ribbon rubber 10 is wound parallel to the tire-circumferential direction D3 in the outside second row L2 and then, the ribbon rubber 10 is wound in the inclining manner with respect to the tire-circumferential direction D3 from the outside second row L2 toward the outside third row L3 as shown in FIG. 11. According to this, a second parallel portion 32 is placed parallel to the tire-circumferential direction D3, and a third inclining portion 23 inclines from the tire-circumferential direction D3 from the outside second row L2 toward the outside third row L3 in the winding direction D31.

The outside second row L2 is composed of a winding-finishing end 22b of the second inclining portion 22, the second parallel portion 32, and a winding-start end 23a of a third inclining portion 23. In FIG. 11 (FIG. 12 is also the same), positions P32a, P32b, P23a and P23b show a position of the winding-start end 32a and a position of the winding-finishing end 32b of the second parallel portion 32, a position of the winding-start end 23a and a position of a winding-finishing end 23b of the third inclining portion 23 in the tire-circumferential direction D3, respectively.

At this time, the winding-start end 23a of the third inclining portion 23 is located at a position more opposite from the winding direction D31 than the winding-start end 22a of the second inclining portion 22. The winding-finishing end 23b of the third inclining portion 23 is located at a position more opposite from the winding direction D31 than the winding-finishing end 22b of the second inclining portion 22. More specifically, the winding-finishing end 23b of the third inclining portion 23 is located at a position more opposite from the winding direction D31 than the winding-start end 22a of the second inclining portion 22.

Therefore, in the outside second row L2 of the tire-width direction D1, since the second inclining portion 22 and the third inclining portion 23 are separated away from each other, a location A6 between the second inclining portion 22 and the third inclining portion 23 becomes a rubber-insufficient area. In this manner, the rubber-surplus areas A4 and A5 of the outside first row L1 and the rubber-insufficient area A6 of the outside second row L2 are adjacent to each other.

Thereafter, the ribbon rubber 10 is wound parallel to the tire-circumferential direction D3 in the outside third row L3. Then, as shown in FIG. 12, the ribbon rubber 10 is wound in the inclining manner with respect to the tire-circumferential direction D3 from the outside third row L3 toward an outside fourth row L4. According to this, a third parallel portion 33 is placed parallel to the tire-circumferential direction D3. The fourth inclining portion 24 inclines from the tire-circumferential direction D3 such that the fourth inclining portion 24 moves from the outside third row L3 toward the outside fourth row L4 in the winding direction D31.

The outside third row L3 is composed of the winding-finishing end 23b of the third inclining portion 23, the third parallel portion 33, and a winding-start end 24a of the fourth inclining portion 24. In FIG. 12, positions P33a, P33b, P24a and P24b respectively show a position of a winding-start end 33a and a position of a winding-finishing end 33b of the third parallel portion 33, and a position of the winding-start end 24a and a position of a winding-finishing end 24b of the fourth inclining portion 24 in the tire-circumferential direction D3.

At this time, the winding-finishing end 33b of the third parallel portion 33 is placed at the same position as the winding-finishing end 23b of the third inclining portion 23 in the winding direction D31. The winding-finishing end 24b of the fourth inclining portion 24 is placed at the same position as the winding-start end 22a of the second inclining portion 22 in the winding direction D31.

Therefore, in the outside third row L3 of the tire-width direction D1, an area A7 where the third parallel portion 33 is superposed on the winding-finishing end 23b of the third inclining portion 23, and an area A8 where the winding-start end 24a of the fourth inclining portion 24 is superposed on the third parallel portion 33 become rubber-surplus areas. In this manner, the rubber-surplus areas A4 and A5 of the outside first row L1 and rubber-surplus areas A7 and A8 of the outside third row L3 sandwich the rubber-insufficient area A6 of the outside second row L2 not only in the tire-width direction D1 but also in the tire-circumferential direction D3. Further, the sum of the rubber-surplus amounts of the rubber-surplus areas A4, A5, A7 and A8 is substantially equal to a rubber-insufficient amount of the rubber-insufficient area A6.

Thereafter, the ribbon rubber 10 is wound parallel to the tire-circumferential direction D3 in the outside fourth row L4 and then, the ribbon rubber 10 is wound in the inclining manner with respect to the tire-circumferential direction D3 such that the ribbon rubber 10 moves from the outside fourth row L4 to the outside fifth row L5. After the outside fifth row L5, the ribbon rubber 10 is switched between the state where the ribbon rubber 10 is wound parallel to the tire-circumferential direction D3 and the state where the ribbon rubber 10 is wound in the inclining manner at the same position in the tire-circumferential direction D3.

Lengths of the tire-circumferential direction D3 of the inclining portions 21 to 24 (rate of inclining portions 21 to 24 to the entire circumference in tire-circumferential direction D3) are set to the same value. For example, the inclining portions 21 to 24 are set to lengths of $\frac{1}{18}$ to $\frac{1}{12}$-circumferential length (length in which rotation angle of winding portion 52 corresponds to 20° to 30°).

According to this, all of inclination angles of the inclining portions 21 to 24 with respect to the tire-circumferential direction D3 are set to the same. For example, the inclination angle is set to 45° or less. Lengths of the inclining portions 21 to 24 in the tire-circumferential directions D3, and inclination angles of the inclining portions 21 to 24 with respect to the tire-circumferential direction D3 may be different from each other.

The tire 1 of this embodiment includes the rubber portion (cap portion 7a of tread rubber 7 in this embodiment) formed by the ribbon rubber 10 which is spirally wound along the tire-circumferential direction D3. The ribbon rubber 10 includes the first inclining portion 21 which inclines with respect to the tire-circumferential direction D3 from the outside second row L2 of the tire-width direction D1 toward the outside first row L1 in a winding direction. The ribbon rubber 10 also includes the first parallel portion 31 placed parallel to the tire-circumferential direction D3 to configure the outside first row L1 of the tire-width direction D1. The winding-start end 31a of the first parallel portion 31 is connected to the winding-finishing end 21b of the first inclining portion 21. The winding-finishing end 31b of the first parallel portion 31 is placed closer to the winding direction D31 than the winding-finishing end 21b of the first inclining portion 21, or is placed at the same position as the winding-finishing end 21b (at the same position as winding-finishing end 21b in this embodiment).

According to this configuration, the first inclining portion 21 inclines from the tire-circumferential direction D3 such that the first inclining portion 21 moves from the outside second row L2 toward the outside first row L1 of the tire-width direction D1 in the winding direction D31. The winding-start end 31a of the first parallel portion 31 is connected to the winding-finishing end 21b of the first inclining portion 21, and the first parallel portion 31 is placed parallel to the tire-circumferential direction D3. According to this, the first parallel portion 31 configures a portion of the outside first row L1 of the tire-width direction D1.

The winding-finishing end 31b of the first parallel portion 31 is placed closer to the winding direction D31 than the winding-finishing end 21b of the first inclining portion 21, or is placed at the same position as the winding-finishing end 21b (at the same position as winding-finishing end 21b in this embodiment). According to this, the first parallel portion 31 is superposed on the entire first inclining portion 21 in the outside first row L1 of the tire-width direction D1. According to this, it is possible to restrain a rubber-insufficient area from generating in an end of the tire-width direction D1 of a rubber portion (cap portion 7a of tread rubber 7 in this embodiment) formed by the ribbon rubber 10, more specifically, it is possible to restrain a rubber-insufficient area from generating in a location of the first inclining portion 21.

In the tire 1 of this embodiment, the ribbon rubber 10 further includes the second inclining portion 22. The winding-start end 22a is connected to the winding-finishing end 31b of the first parallel portion 31, and the second inclining portion 22 inclines with respect to the tire-circumferential direction D3 from the outside first row L1 toward the outside second row L2 of the tire-width direction D1 in the winding direction D31. The ribbon rubber 10 also includes the second parallel portion 32, the winding-start end 32a is connected to the winding-finishing end 22b of the second inclining portion 22, and the second parallel portion 32 is placed parallel to the tire-circumferential direction D3 to configure the outside second row L2 of the tire-width direction D1. The ribbon rubber 10 also includes the third inclining portion 23, the winding-start end 23a of the third inclining portion 23 is connected to the winding-finishing end 32b of the second parallel portion 32, and the third inclining portion 23 inclines with respect to the tire-circumferential direction D3 from the outside second row L2 of the tire-width direction D1 toward the outside third row L3 of the winding direction D31. The winding-start end 23a of the third inclining portion 23 is placed at a position more opposite from the winding direction D31 than the winding-start end 22a of the second inclining portion 22. The winding-finishing end 23b of the third inclining portion 23 is placed at a position more opposite from the winding direction D31 than the winding-finishing end 22b of the second inclining portion 22.

According to this configuration, the winding-start end 22a is connected to the winding-finishing end 31b of the first parallel portion 31, and the second inclining portion 22 inclines with respect to the tire-circumferential direction D3 from the outside first row L1 of the tire-width direction D1 toward the outside second row L2 in the winding direction D31. According to this, the outside first row L1 of the tire-width direction D1 is composed of the winding-finishing end 21b of the first inclining portion 21, the first parallel portion 31 and the winding-start end 22a of the second inclining portion 22.

In the outside first row L1 of the tire-width direction D1, the first parallel portion 31 is superposed on the winding-finishing end 21b of the first inclining portion 21, and the winding-start end 22a of the second inclining portion 22 is superposed on the first parallel portion 31. Therefore, in the outside first row L1 of the tire-width direction D1, the areas A4 and A5 become the rubber-surplus areas.

The winding-start end 32a is connected to the winding-finishing end 22b of the second inclining portion 22, and the second parallel portion 32 is placed parallel to the tire-circumferential direction D3. The winding-start end 23a is connected to the winding-finishing end 32b of the second parallel portion 32, and the third inclining portion 23 inclines with respect to the tire-circumferential direction D3 from the outside second row L2 toward the outside third row L3 of the tire-width direction D1 in the winding direction D31. According to this, the outside second row L2 of the tire-width direction D1 is composed of the winding-finishing end 22b of the second inclining portion 22, the second parallel portion 32, and the winding-start end 23a of the third inclining portion 23.

The winding-start end 23a of the third inclining portion 23 is placed at a position more opposite from the winding direction D31 than the winding-start end 22a of the second inclining portion 22, and the winding-finishing end 23b of the third inclining portion 23 is placed at a position more opposite from the winding direction D31 than the winding-finishing end 22b of the second inclining portion 22. According to this, since the second inclining portion 22 and the third inclining portion 23 are separated away from each other in the outside second row L2 of the tire-width direction D1, an area A6 between the second inclining portion 22 and the third inclining portion 23 becomes a rubber-insufficient area.

The rubber-surplus areas A4 and A5 of the outside first row L1 of the tire-width direction D1 are adjacent to the rubber-insufficient area A6 of the outside second row L2 of the tire-width direction D1. This configuration restrains a rubber weight of the tire 1 from becoming non-uniform. Therefore, it is possible to restrain RFV (Radial Force Variation) from becoming large.

In the tire 1 of this embodiment, the ribbon rubber 10 includes the third parallel portion 33, the winding-start end 33a of the third parallel portion 33 is connected to the winding-finishing end 23b of the third inclining portion 23, and the third parallel portion 33 is placed parallel to the tire-circumferential direction D3 to configure the outside third row L3 of the tire-width direction D1. The ribbon rubber 10 further includes the fourth inclining portion 24, the winding-start end 24a of the fourth inclining portion 24 is connected to the winding-finishing end 33b of the third parallel portion 33, and the fourth inclining portion 24 inclines with respect to the tire-circumferential direction D3 from the outside third row L3 toward the outside fourth row L4 of the tire-width direction D1 in the winding direction D31. The winding-finishing end 23b of the third inclining portion 23 is placed at a position more opposite from the winding direction D31 than the winding-start end 22a of the second inclining portion 22, or is placed at the same position as the winding-start end 22a (at position more opposite from winding direction D31 than winding-start end 22a in this embodiment). The winding-finishing end 33b of the third parallel portion 33 is placed at the position closer to the winding direction D31 than the winding-finishing end 23b of the third inclining portion 23, or is placed at the same position as the winding-finishing end 23b (at the same position as winding-finishing end 23b in this embodiment). The winding-finishing end 24b of the fourth inclining portion 24 is placed at a position more opposite from the winding direction D31 than the winding-start end 22a of the second inclining portion 22, or is placed at the same position as the winding-start end 22a (at the same position as winding-start end 22a in this embodiment).

According to this configuration, the winding-start end 33a of the third parallel portion 33 is connected to the winding-finishing end 23b of the third inclining portion 23, and the third parallel portion 33 is placed parallel to the tire-circumferential direction D3. The winding-start end 24a of the fourth inclining portion 24 is connected to the winding-finishing end 33b of the third parallel portion 33, and the fourth inclining portion 24 inclines with respect to the tire-circumferential direction D3 from the outside third row L3 toward the outside fourth row L4 of the tire-width direction D1 in the winding direction D31. According to this, the outside third row L3 of the tire-width direction D1 is composed of the winding-finishing end 23b of the third inclining portion 23, the third parallel portion 33, and the winding-start end 24a of the fourth inclining portion 24.

The winding-finishing end 33b of the third parallel portion 33 is placed closer to the winding direction D31 than the winding-finishing end 23b of the third inclining portion 23, or is placed at the same position as the winding-finishing end 23b (at the same position as winding-finishing end 23b in this embodiment). According to this, in the outside third row L3 of the tire-width direction D1, the third parallel portion 33 is superposed on the winding-finishing end 23b of the third inclining portion 23, and the winding-start end 24a of the fourth inclining portion 24 is superposed on the third parallel portion 33. Therefore, the areas A7 and A8 become the rubber-surplus areas.

The winding-finishing end 23b of the third inclining portion 23 is placed at a position more opposite from the winding direction D31 than the winding-start end 22a of the second inclining portion 22, or placed at the same position as the winding-start end 22a (at the same position as winding-start end 22a in this embodiment). The winding-finishing end 24b of the fourth inclining portion 24 is placed at a position more opposite from the winding direction D31 than the winding-start end 22a of the second inclining portion 22, or at the same position as the winding-start end 22a (at position more opposite from the winding direction D31 than winding-start end 22a in this embodiment).

According to this, the rubber-surplus areas A4 and A5 of the outside first row L1 of the tire-width direction D1 and the rubber-surplus areas A7 and A8 of the outside third row L3 of the tire-width direction D1 sandwich the rubber-insufficient area A6 of the outside second row L2 of the tire-width direction D1 not only in the tire-width direction D1 but also in the tire-circumferential direction D3. This configuration effectively restrains a rubber weight of the tire 1 from becoming non-uniform. Therefore, it is possible to restrain RFV (Radial Force Variation) from becoming large.

The tire is not limited to the configuration of the embodiment, and the tire is not limited to the above-described working effect. The tire can variously be changed within a range not departing from the subject matter of the present invention. For example, it is possible to freely select one or more of the configurations or methods according to the later-described various modifications, and to employ them in the configurations or the method of the above-described embodiments.

In the tire 1 of the embodiment, the ribbon rubber 10 is wound such that it becomes two layers in the tire-radial direction D2 and such that both ends of the ribbon rubber 10 in the tire-width direction D1 are folded back (twice). However, the tire is not limited to this configuration. For example, in the tire, the ribbon rubber 10 is not limited to the number of layers in the tire-radial direction D2, or is not limited to the number of the folding-back operations at the ends in the tire-width direction D1.

In short, it is only necessary that at least one of ends of the ribbon rubber 10 in the tire-width direction D1 is folded back. For example, as shown in FIG. 13, only one side end of the ribbon rubber 10 in the tire-width direction D1 may be folded back.

Figure 13:
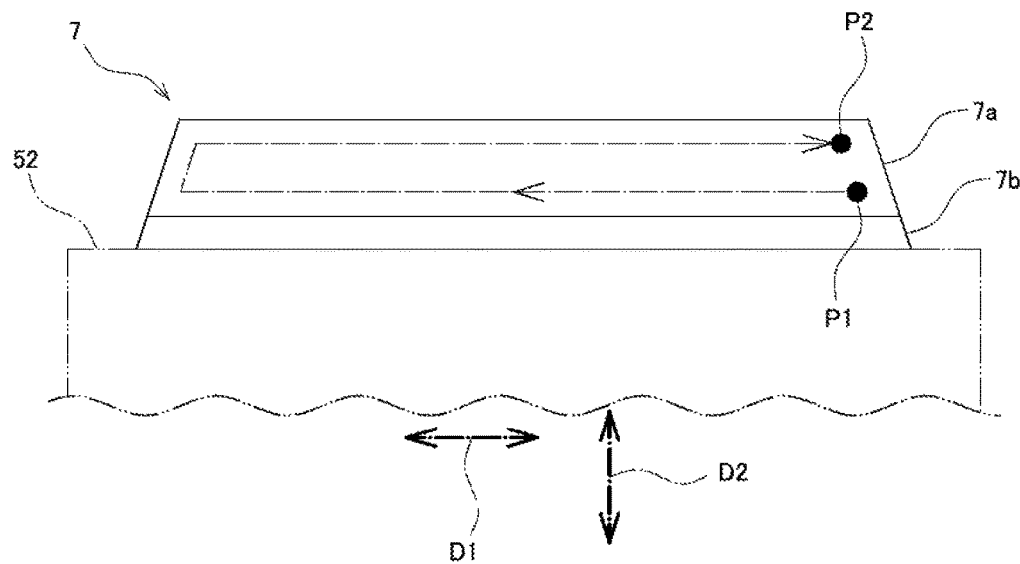
FIG. 13 is a sectional view in a tire meridian surface for describing a winding state of a ribbon rubber of a tire according to another embodiment.

In FIG. 13, the ribbon rubber 10 is wound around the winding portion 52 from the start-point P1 on the other end (right end in FIG. 13) of the tire-width direction D1 in the cross section of the tire meridian surface toward the one side (left side in FIG. 13) of the tire-width direction D1. Thereafter, one side end of the ribbon rubber 10 in the tire-width direction D1 is folded back toward the other side in the tire-width direction D1, and the ribbon rubber 10 is wound around the winding portion 52 toward the ending-point P2 of the other end of the tire-width direction D1.

In the tire 1 of the embodiment, the forming device 50 which forms the rubber portion (cap portion 7a of tread rubber 7) includes one extruding portion 51 for one winding portion 52. However, the tire is not limited to this configuration.

Figure 14:
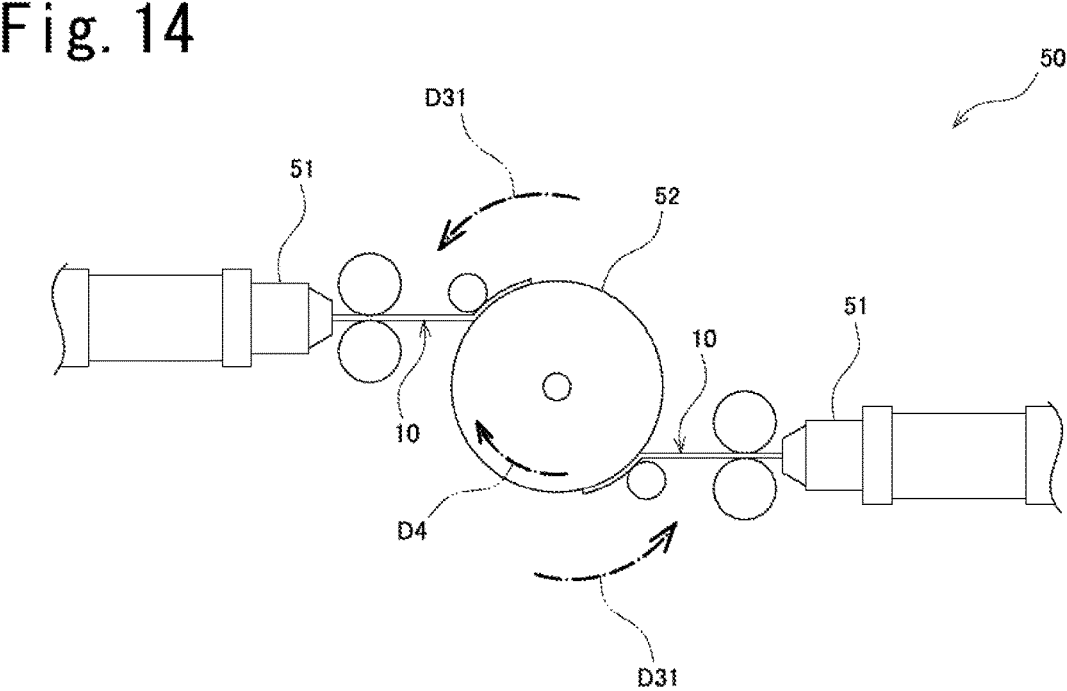
FIG. 14 is a schematic diagram of production facilities for forming a tire of another embodiment.

For example, in the tire, as shown in FIG. 14, the forming device 50 includes a plurality of (two in FIG. 14) extruding portions 51 for one winding portion 52. The cap portion 7a of the tread rubber 7 formed by the forming device 50 according to FIG. 14 includes two first inclining portions 21 and two second inclining portions 22 in the outside first row L1 of the tire-width direction D1, for example.

In the tire 1 of the embodiment, the winding-finishing end 31b of the first parallel portion 31 is placed at the same position as the winding-finishing end 21b of the first inclining portion 21 in the winding direction D31. However, the tire is not limited to this configuration. For example, in the tire, the winding-finishing end 31b of the first parallel portion 31 may be placed closer to the winding direction D31 than the winding-finishing end 21b of the first inclining portion 21. Here, it is preferable that the configuration of the tire 1 of the embodiment is employed to make the rubber-surplus area of the outside first row L1 small.

In the tire 1 of the embodiment, the winding-start end 23a of the third inclining portion 23 is placed at a position more opposite from the winding direction D31 than the winding-start end 22a of the second inclining portion 22, the winding-finishing end 23b of the third inclining portion 23 is placed at a position more opposite from the winding direction D31 than the winding-finishing end 22b of the second inclining portion 22. However, the tire is not limited to this configuration.

For example, the winding-start end 23a of the third inclining portion 23 may be placed closer to the winding direction D31 than the winding-start end 22a of the second inclining portion 22. Further, the winding-finishing end 23b of the third inclining portion 23 may be placed closer to the winding direction D31 than the winding-finishing end 22b of the second inclining portion 22, for example. The third inclining portion 23 may be placed such that it is superposed on the second inclining portion 22 or the second parallel portion 32. To restrain the rubber weight of the tire 1 from becoming non-uniform, it is preferable to employ the configuration of the tire 1 of the embodiment.

In the tire 1 of the embodiment, the winding-finishing end 33b of the third parallel portion 33 is placed at the same position as the winding-finishing end 23b of the third inclining portion 23 in the winding direction D31. However, the tire is not limited to this configuration. For example, in the tire, the winding-finishing end 33b of the third parallel portion 33 may be placed at a position more opposite from the winding direction D31 than the winding-finishing end 23b of the third inclining portion 23.

To restrain the rubber weight of the tire 1 from becoming non-uniform, it is preferable that the winding-finishing end 33b of the third parallel portion 33 is placed closer to the winding direction D31 than the winding-finishing end 23b of the third inclining portion 23. Further, to more effectively restrain the rubber weight of the tire 1 from becoming non-uniform, it is preferable to employ the configuration of the tire 1 of the embodiment.

In the tire 1 of the embodiment, the winding-finishing end 24b of the fourth inclining portion 24 is placed at the same position as the winding-start end 22a of the second inclining portion 22. However, the tire is not limited to this configuration. For example, in the tire, the winding-finishing end 24b of the fourth inclining portion 24 may be placed closer to the winding direction D31 than the winding-start end 22a of the second inclining portion 22.

To restrain the rubber weight of the tire 1 from becoming non-uniform, it is preferable that the winding-finishing end 24b of the fourth inclining portion 24 is placed at a position more opposite from the winding direction D31 than the winding-start end 22a of the second inclining portion 22. Further, to more effectively restrain the rubber weight of the tire 1 from becoming non-uniform, it is preferable to employ the configuration of the tire 1 of the embodiment.

In the tire 1 of the embodiment, the rubber portion formed by the ribbon rubber 10 which is spirally wound along the tire-circumferential direction D3 is the cap portion 7a of the tread rubber 7. However, the tire is not limited to this configuration. For example, in the tire, the rubber portion formed by the ribbon rubber 10 may be the entire tread rubber 7 (cap portion 7a and base portion 7b). That is, a rubber portion formed by the ribbon rubber 10 is not limited.

In the tire 1 of the embodiment, the first parallel portion 31 is placed around the tire-circumferential direction D3 by one circuit. However, the tire is not limited to this configuration. For example, in the tire, the first parallel portion 31 may be placed around the tire-circumferential direction D3 by a plurality of circles.

The tire 1 includes a tire (unvulcanized tire) before vulcanization and a tire (vulcanized tire) after vulcanization. In the tire after vulcanization, if the tire 1 is cut by a sharp cutter, and it is possible to observe a boundary surface of the ribbon rubber 10 by its cross section. According to this, it is possible to specify the winding state of the ribbon rubber 10.

What is claimed is:

1. A tire comprising:
a rubber portion formed by a ribbon rubber which is spirally wound along a tire-circumferential direction, wherein
the ribbon rubber includes:
a first inclining portion which inclines with respect to the tire-circumferential direction from an outside second row of a tire-width direction toward an outside first row in a winding direction; and
a first parallel portion placed parallel to the tire-circumferential direction to configure the outside first row of the tire-width direction, a winding-start end of the first parallel portion being connected to a winding-finishing end of the first inclining portion,
the winding-finishing end of the first parallel portion is placed at a position further in the winding direction than the winding-finishing end of the first inclining portion, or is placed at the same position as the winding-finishing end; and
wherein the outside second row is sequentially adjacent the outside first row, and
wherein the ribbon rubber further includes:
a second inclining portion which inclines with respect to the tire-circumferential direction from the outside first row of the tire-width direction in the winding direction toward the outside second row, a winding-start end of the second inclining portion being connected to the winding-finishing end of the first parallel portion, and
a second parallel portion placed parallel to the tire-circumferential direction to configure the outside second row of the tire-width direction, a winding-start end of the second parallel portion being connected to a winding-finishing end of the second inclining portion.

2. The tire according to claim 1, wherein
the ribbon rubber further includes:
a third inclining portion which inclines with respect to the tire-circumferential direction from the outside second row of the tire-width direction in the winding direction toward an outside third row that is sequentially adjacent to the outside second row on a side opposite to the outside first row, a winding-start end of the third inclining portion being connected to the winding-finishing end of the second parallel portion,
the winding-start end of the third inclining portion is placed at a position further in a direction opposite to the winding direction than the winding-start end of the second inclining portion, and
the winding-finishing end of the third inclining portion is placed at a position further in a direction opposite to the winding direction than the winding-finishing end of the second inclining portion.

3. The tire according to claim 2, wherein
the ribbon rubber further includes:
a third parallel portion placed parallel to the tire-circumferential direction to configure the outside third row of the tire-width direction, a winding-start end of the third parallel portion being connected to the winding-finishing end of the third inclining portion; and
a fourth inclining portion which inclines with respect to the tire-circumferential direction from the outside third row of the tire-width direction in the winding direction toward an outside fourth row that is sequentially adjacent to the outside third row on a side opposite to the outside second row, a winding-start end of the fourth inclining portion being connected to the winding-finishing end of the third parallel portion,
the winding-finishing end of the third inclining portion is placed at a position further in a direction opposite to the winding direction than the winding-start end of the second inclining portion or is placed at the same position as the winding-start end,
the winding-finishing end of the third parallel portion is placed at a position further in the winding direction than the winding-finishing end of the third inclining portion, or is placed at the same position as the winding-finishing end, and
the winding-finishing end of the fourth inclining portion is placed at a position further in a direction opposite to the winding direction than the winding-start end of the second inclining portion, or is placed at the same position as the winding-start end.

4. The tire according to claim 3, wherein
the winding-finishing end of the first parallel portion is placed at the same position as the winding-finishing end of the first inclining portion,
the winding-finishing end of the third inclining portion is placed at a position further in a direction opposite to the winding direction than the winding-start end of the second inclining portion, and is placed at the same position as the winding-start end of the first inclining portion,
the winding-finishing end of the third parallel portion is placed at the same position as the winding-finishing end of the third inclining portion, and
the winding-finishing end of the fourth inclining portion is placed at the same position as the winding-start end of the second inclining portion.

5. The tire according to claim 4, wherein
all of lengths of the inclining portions in the tire-circumferential direction are the same.

6. The tire according to claim 4, wherein
all of inclination angles of the inclining portions with respect to the tire-circumferential direction are the same.

* * * * *